US009631288B2

(12) United States Patent
Lin (10) Patent No.: US 9,631,288 B2
(45) Date of Patent: Apr. 25, 2017

(54) GAS GENERATOR

(71) Applicant: Hsin-Yung Lin, Shanghai (CN)

(72) Inventor: Hsin-Yung Lin, Shanghai (CN)

(\*) Notice: Subject to any disclaimer, the term of this patent is extended or adjusted under 35 U.S.C. 154(b) by 103 days.

(21) Appl. No.: 14/553,002

(22) Filed: Nov. 25, 2014

(65) Prior Publication Data

US 2015/0144483 A1 May 28, 2015

(30) Foreign Application Priority Data

Nov. 28, 2013 (CN) .......................... 2013 1 0631887

(51) Int. Cl.
| | | |
|---|---|---|
| C25B 1/04 | (2006.01) | |
| C25B 15/02 | (2006.01) | |
| C25B 15/00 | (2006.01) | |
| C25B 9/06 | (2006.01) | |

(52) U.S. Cl.
CPC ............... *C25B 15/02* (2013.01); *C25B 1/04* (2013.01); *C25B 9/06* (2013.01); *C25B 15/00* (2013.01); *Y02E 60/366* (2013.01)

(58) Field of Classification Search
CPC .............................................. C25B 1/04–1/12
USPC .................................................. 204/239, 241
See application file for complete search history.

(56) References Cited

U.S. PATENT DOCUMENTS

| | | | | |
|---|---|---|---|---|
| 1,586,435 A | * | 5/1926 | Arnalot ..................... | C25B 9/06 204/239 |
| 5,690,797 A | * | 11/1997 | Harada ..................... | C25B 1/12 204/228.5 |
| 5,733,422 A | * | 3/1998 | Lin ........................... | C25B 15/02 204/228.2 |
| 5,888,361 A | * | 3/1999 | Hirai ........................ | C25B 1/04 118/429 |
| 6,630,061 B2 | * | 10/2003 | Lee ........................... | C25B 1/04 204/239 |
| 2004/0038096 A1 | * | 2/2004 | Chou ....................... | C25B 15/02 429/413 |
| 2008/0202921 A1 | * | 8/2008 | Wilkinson ................ | C25B 1/04 204/247 |
| 2010/0038236 A1 | * | 2/2010 | Rivera ..................... | C25B 1/04 204/270 |

(Continued)

FOREIGN PATENT DOCUMENTS

| CN | 2149405 Y | 12/1993 |
|---|---|---|
| CN | 2288976 Y | 8/1998 |

(Continued)

OTHER PUBLICATIONS

Alkaline Electrolytic Tank.

*Primary Examiner* — Harry D Wilkins, III (74) *Attorney, Agent, or Firm* — Foster Pepper PLLC (57) ABSTRACT

The present invention discloses a gas generator with a cooling system and comprises an outer tank, an inner tank, and an electrolytic tank module. The outer tank is accommodated a coolant for cooling the electrolytic tank module and inner tank configured in the outer tank, whereby the temperature of the gas generator will be decreased to prevent the hydrogen explosion. Furthermore, in the present invention, the hydrogen-oxygen gas generated by the electrolytic tank module will be inputted to the inner tank, and the temperature of the hydrogen-oxygen gas will be further decreased through the liquid water in the inner tank to decrease the probability of the hydrogen explosion.

18 Claims, 9 Drawing Sheets

(56) References Cited

U.S. PATENT DOCUMENTS

| | | | |
|---|---|---|---|
| 2010/0300381 A1* | 12/2010 | Harper | C25B 1/08 123/3 |
| 2011/0203917 A1* | 8/2011 | Shmueli | C25B 1/06 204/237 |
| 2012/0111734 A1* | 5/2012 | Kramer | C25B 1/06 205/412 |
| 2014/0096728 A1* | 4/2014 | Ortenheim | C25B 9/04 123/3 |
| 2015/0211131 A1* | 7/2015 | Jacobs | C25B 15/02 204/236 |

FOREIGN PATENT DOCUMENTS

| | | |
|---|---|---|
| CN | 2538814 Y | 3/2003 |
| CN | 201545916 U | 8/2010 |
| CN | 201940505 U | 8/2011 |
| CN | 202157120 U | 3/2012 |
| CN | 203295619 U | 11/2013 |
| CN | 203613267 U | 5/2014 |
| FR | 2410059 A1 * | 6/1979 |
| WO | WO 2014/036599 A1 * | 3/2014 |

* cited by examiner

GAS GENERATOR

PRIORITY CLAIM

This application claims the benefit of the filing date of Chinese Patent Application No. 201310631887, filed Nov. 28, 2013, entitled "A GAS GENERATOR," and the contents of which are hereby incorporated by reference in their entirety.

FIELD OF THE INVENTION

The present invention relates to a gas generator, more particularly, to the gas generator with a cooling system.

BACKGROUND

From the beginning until now, humanity has always made preserving life a high priority. Many developments in medical technology are used for diseases and increasing life expectancy. In the past, most medical treatment was passive. In other words, diseases are treated only when people fall ill, by performing surgical operation, medication, chemotherapy, radiation treatment and so on. But recently, many medical experts are focused on disease prevention, such as studying on the health foods, and screening for inherited diseases to actively reduce the risk of falling ill. Furthermore, in order to increase the life expectancy, many anti-aging technologies have been developed, including skin care products and antioxidant food/medicine and so on. Studies have found that there is an unstable oxygen species (O+), also known as free radicals, in the human body. The free radicals are usually generated due to diseases, diet, environment and one's life style, and the free radicals in human body can be exerted in the form of water by reacting with the inhaling hydrogen. With this method the amount of free radicals in the human body can be reduced, thereby restoring the body condition from an acidic state to an alkaline state, achieving an anti-oxidation, anti-aging, beauty and health effect, and even eliminating chronic diseases. There are also clinical experiments showing that, for patients who inhale a high concentration of oxygen for a long time, the lung damage from the high concentration of oxygen can be ameliorated by the inhaling hydrogen.

Furthermore, the function of hydrogen-oxygen gas cannot only achieve for the health effect, but also for generating an oxy-hydrogen flame to heat or burn and cleaning engine accumulating carbon. The normal hydrogen-oxygen gas is generated from liquid water electrolyzed in an electrolytic tank. However, the process for electrolyzing the liquid water easily generates high working temperature. In order to prevent a hydrogen explosion in the high working temperature, the traditional electrolytic tanks for generating the hydrogen-oxygen gas mostly use the air-cooling type, in other words, using fans for decreasing the temperature. However, if a fault of fans occurred, it would increase the temperature of the electrolytic tank of hydrogen-oxygen gas to cause the hydrogen explosion.

SUMMARY OF THE INVENTION

Therefore, the present invention provides a gas generator with a cooling system for decreasing the temperature of the electrolytic tank to increase its safety. The gas generator comprises an outer tank, an inner tank, and an electrolytic tank module. The outer tank has a first hollow portion for accommodating a coolant. The inner tank is configured within the first hollow portion of the outer tank. The inner tank has a second hollow portion for accommodating liquid water. The inner tank is connected to a gas-out pipe exposed from the outer tank. The electrolytic tank module is configured in the first hollow portion of the outer tank for electrolyzing the liquid water, wherein part of or the entire electrolytic tank module is immersed in the coolant. The electrolytic tank module is supplied with the liquid water from the inert tank through a liquid pipe. The electrolytic tank module electrolyzes the liquid water to generate a hydrogen-oxygen gas. The hydrogen-oxygen gas is outputted from the electrolytic tank module to the inner tank through a gas pipe, and then the hydrogen-oxygen gas is outputted through the gas-out pipe of the inner tank.

The electrolytic tank module of the present invention selectively comprises at least one electrolytic tank and at least one connected tank, wherein the electrolytic tank has a third hollow portion, a water inlet, and a gas outlet. The third hollow portion is used for accommodating the liquid water. The gas outlet of the electrolytic tank is corresponded to a gas inlet of the inner tank and connects to the gas inlet of the inner tank by the gas pipe. The electrolytic tank is removably configured in the electrolytic tank module. The water inlet of the electrolytic tank is corresponded to an opening of the connected tank. The liquid pipe is connected to the connected tank.

The electrolytic tank module further selectively comprises a tank shelf. The tank shelf comprises a plurality of first longitudinal perforations. The electrolytic tank comprises a tank body, and the tank body is correspondingly configured within one of the first longitudinal perforations of the tank shelf.

The electrolytic tank module further selectively comprises an electrode shelf. The electrode shelf comprises a plurality of second longitudinal perforations. The electrolytic tank comprises an electrode plate. The electrode plate is correspondingly configured within one of the second longitudinal perforations, and the under portion of the electrode plate is configured within the third hollow portion of the electrolytic tank.

The tank shelf selectively comprises a first cylinder. The tank body of the electrolytic tank is penetrated through the first cylinder. The electrode shelf comprises a second cylinder. The upper electrode plate of the electrolytic tank is penetrated through the second cylinder. The entire tank body of the electrolytic tank is selectively immersed in the coolant. At the same time, an outer surface of the tank body of the electrolytic tank is selectively coated with an insulating material.

But not limited thereto, in practical application, the entire electrolytic tank module and the part of the inner tank can be selectively immersed in the coolant. Furthermore, the electrolytic tank further selectively comprises a cover body. The cover body is used for isolating between the electrode plate and the tank body. The first cylinder of the tank shelf is connected to a conductive element, and the second cylinder of the electrode shelf is connected to another conductive element so as to make the electrode plate of the electrolytic tank be an anode and the tank body of the electrolytic tank be a cathode.

The outer tank is selectively configured a drain pipe and a valve cooperating with the drain pipe, using for discharging the coolant from the outer tank. Wherein the invention is selectively comprise a connected tank connected to the drain pipe for connecting the drain pipe and a transfusion pipe to discharge the liquid water from the inner tank and the electrolytic tank.

The outer tank also selectively comprises a supporting shelf. A plurality of tongue portions are configured in the inner tank for fixing the inner tank on the supporting shelf of the outer tank.

Furthermore, the present invention further provides a gas generator. The gas generator comprises an outer tank, an inner tank, and an electrolytic tank module. The outer tank has a first hollow portion for accommodating a coolant. The inner tank has a second hollow portion for accommodating liquid water. The electrolytic tank module comprises a plurality of removable electrolytic tanks, tank shelves, and electrode shelves. Each electrolytic tank has a tank body and an electrode plate, wherein the tank shelf is electrically connected to tank body of each electrolytic tank. The tank shelf having a first cylinder can be electrically connected to a second conductive element, whereby the electricity is conducted from the second conductive element to the tank body through the tank shelf. Furthermore, the electrode shelf is electrically connected to electrode plate of each electrolytic tank. The electrode shelf having a second cylinder can be electrically connected to a first conductive element, whereby the electricity is conducted from the first conductive element to the electrode plate through the electrode shelf. Thereof, the pluralities of removable electrolytic tanks are electrically connected in parallel.

Therefore, the part of or the entire tank body of the electrolytic tank can be selectively immersed in the coolant; the electrolytic tank further comprises a cover body, the cover body is used for isolating between the electrode plate and the tank body; and an outer surface of the tank body of the electrolytic tank is coated with an insulating material.

In conclusion, the emphasis of the present invention is that provides a gas generator with a cooling system. The gas generator has an outer tank, an inner tank, and an electrolytic tank module. The heat causing by electrolyzing water can be reduced through immersing the electrolytic tank module in the outer tank. And then the risk of hydrogen explosion in the high temperature would be further decreased through immersing the electrolytic tank module in the outer tank.

DETAILED DESCRIPTION

In order for the advantages, spirits and characteristics of the present invention to be more clearly and easily understood, the embodiments and appended drawings thereof are discussed in the following. It should be noted that, these embodiments are only the representational embodiment of the present invention, wherein the embodiment or corresponding embodiment of the present invention is not limited by the specific method, device, condition, material and so on exampled in the present invention.

Figure 1:
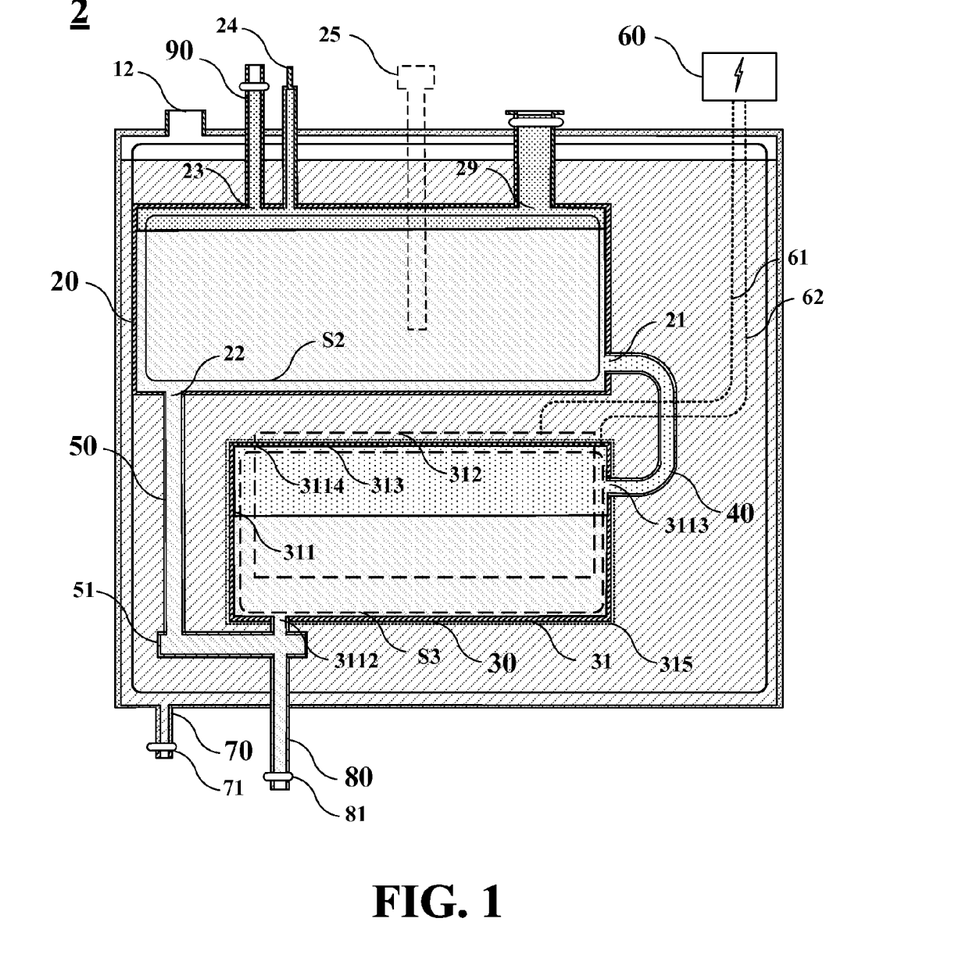
FIG. 1 is a schematic diagram illustrating the gas generator of the present invention according to a preferred embodiment.
Figure 2:
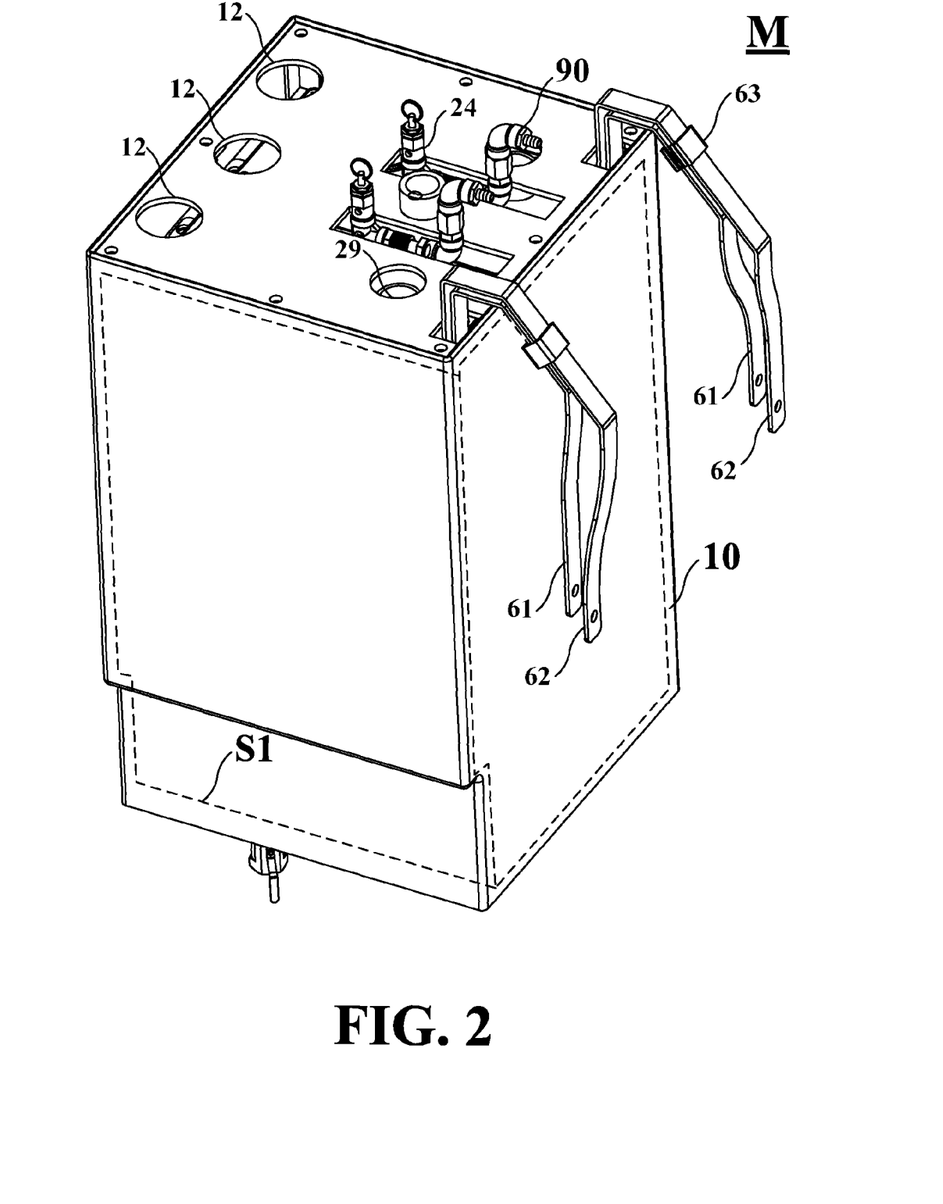
FIG. 2 and FIG. 3 are stereoscopic schematic diagrams, in different Visual angles, illustrating the present invention according to a preferred embodiment.
Figure 3:
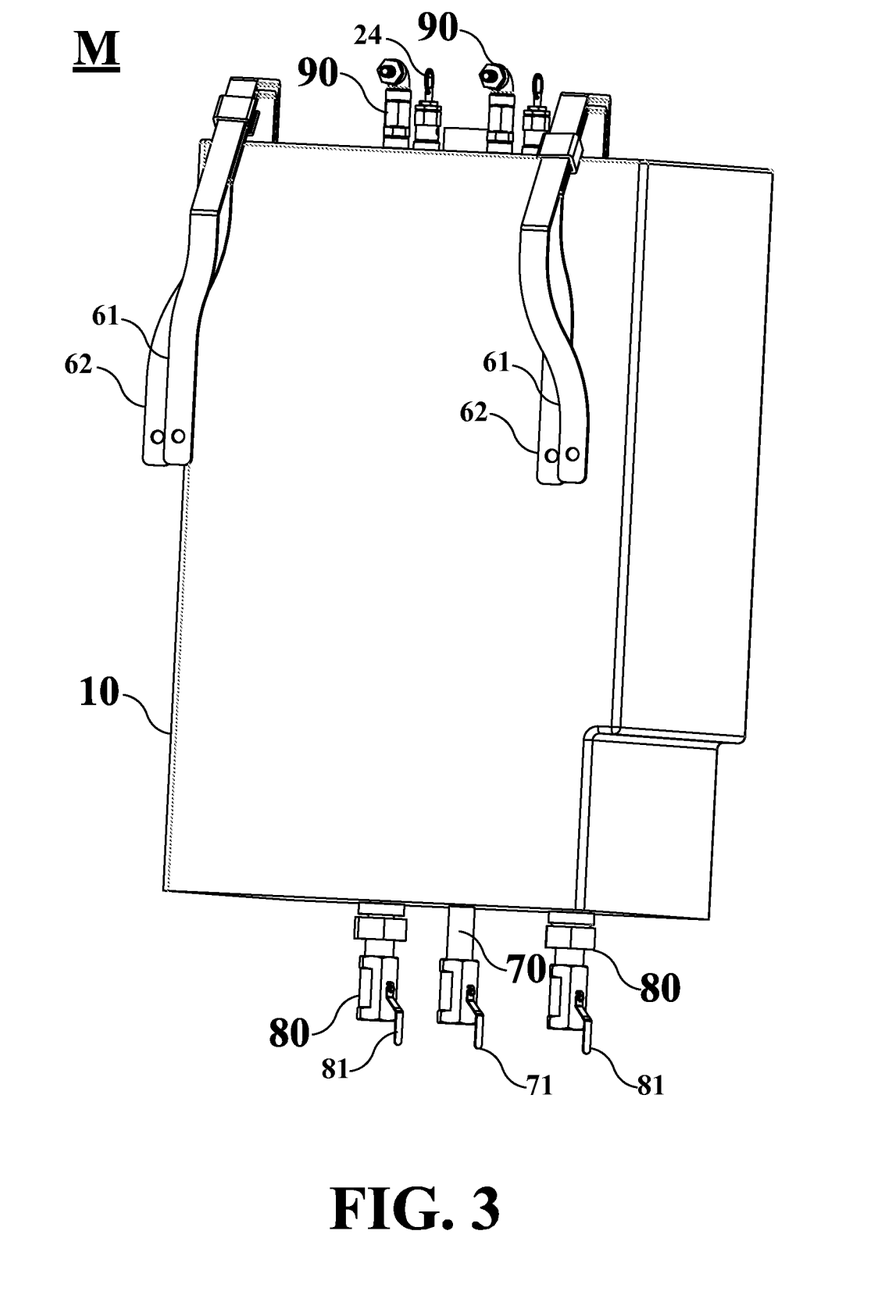
Figure 4:
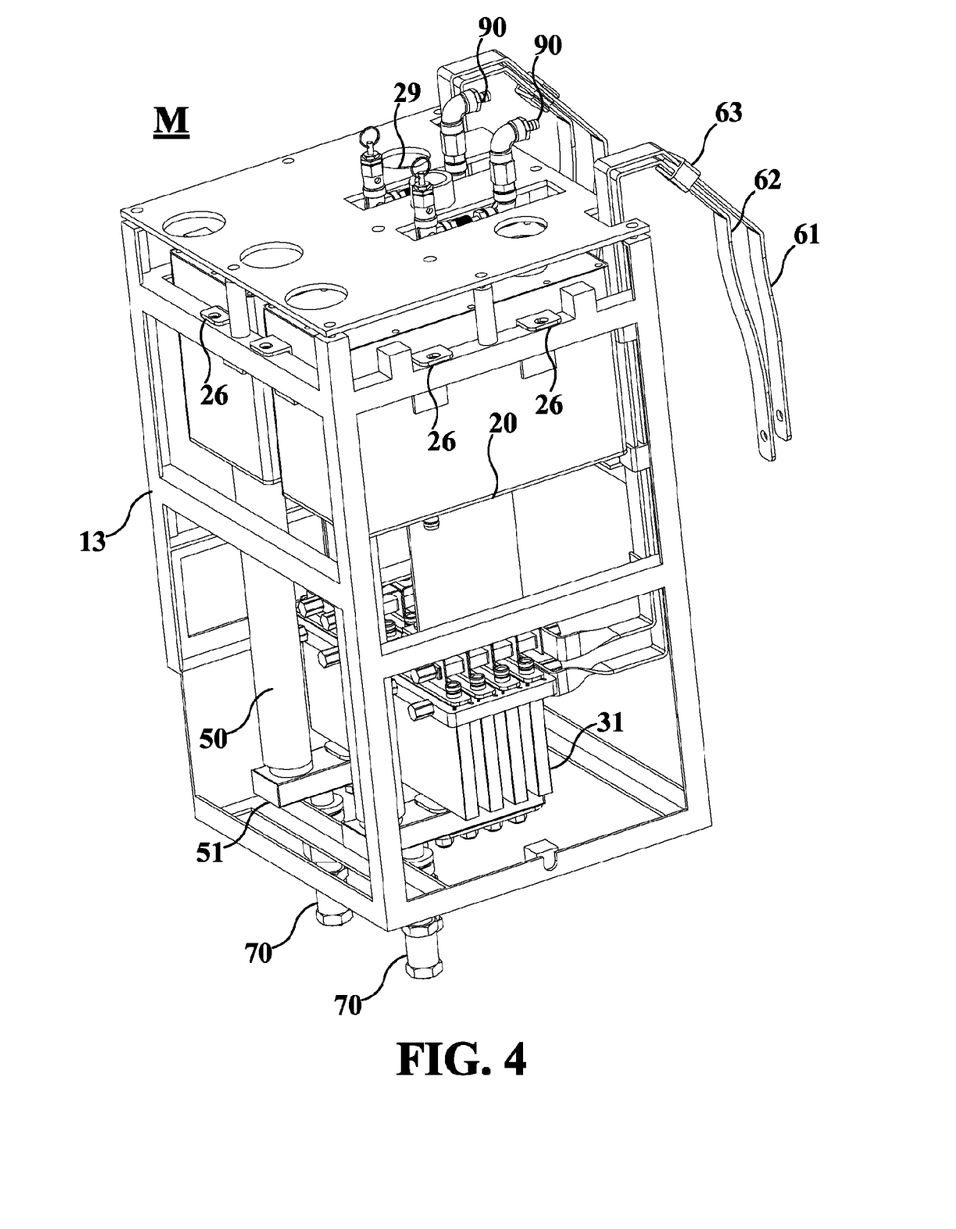
FIG. 4 is a schematic diagram illustrating the FIG. 3 according to a preferred embodiment without the outer tank.
Figure 5:
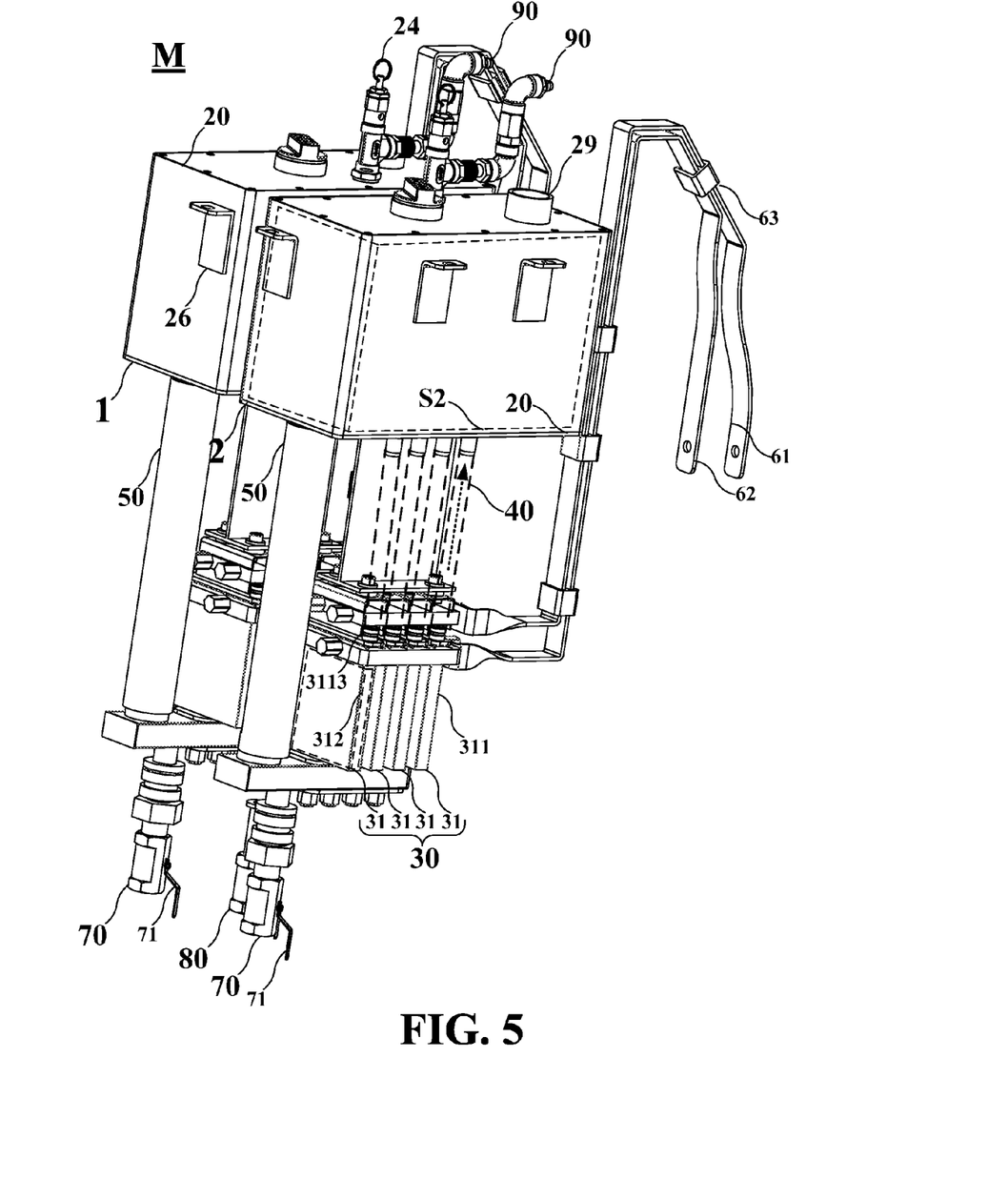
FIG. 5 is a schematic diagram illustrating the FIG. 4 according to a preferred embodiment without the supporting shelf

Please refer to FIG. 1 to FIG. 5. FIG. 1 is a schematic diagram illustrating the gas generator of the present invention according to a preferred embodiment. FIG. 2 and FIG. 3 are stereoscopic schematic diagrams, in different Visual angles, illustrating the present invention according to a preferred embodiment. FIG. 4 is a schematic diagram illustrating the FIG. 3 according to a preferred embodiment without the outer tank. And FIG. 5 is a schematic diagram illustrating the FIG. 4 according to a preferred embodiment without the supporting shelf It should be noted that, FIG. 1 is used for illustrating the relationship and the operating principle between each devices, and it design has been appropriately adjusted.

As shown in the figure, in the present embodiment, the main components of the gas generator comprise an outer tank 10, an inner tank 20, and an electrolytic tank module 30. The inner tank 20 is used for accommodating liquid water. The electrolytic tank module 30 is supplied with the liquid water through the inert tank 20. The electrolytic tank module 30 comprises a plurality of electrolytic tanks 31. Each electrolytic tank 31 electrolyzes the liquid water to generate a hydrogen-oxygen gas, and the hydrogen-oxygen gas is outputted through the inner tank 20 for using.

In the present embodiment, each electrolytic tank 31 is an electrolytic tank with the flat shape and is composed of a tank body 311, an electrode plate 312, and a cover body 313. Each tank body 311 has a third hollow portion S3. The electrode plate 312 and cover body 313 are embedded in the tank body 311 to make the third hollow portion S3 of each electrolytic tank 31 and a first hollow portion Si of the outer tank are waterproof and isolated from each other. In the present embodiment, the tank body 311 and the electrode plate 312 are separately electrically connected to a power source 60 through conductive elements 61, 62 to make the tank body 311 and the electrode plate 312 have corresponding electric properties. In the present embodiment, the tank body 311 of electrolytic tank 31 can be a cathode, and the electrode plate 312 of electrolytic tank 31 can be an anode, but not limited thereto. In practical application, the electric properties of the tank body 311 and the electrode plate 312 are adjusted by the user according to the need of the design and their need. In order to prevent the short circuit, an isolation pad 63 is configured between the conductive elements 61, 62 for isolating each other. In practical application, surface of the tank body 311 can be selectively coated with an insulating material 315, and the cover body 313 can make the electrode plate 312 and tank body 311 are electrical insulation.

In one embodiment, an electrolytic tank module 30 comprises a plurality of removable electrolytic tanks 31, tank shelves 32 and electrode shelves 33. Each electrolytic tank 31 has a tank body 311 and an electrode plate 312. The tank shelf 32 is electrically connected to the tank body 311 of each electrolytic tank 31. The tank shelf 32 has a first cylinder 322 to make the tank shelf 32 electrically connect to a conductive element 62, whereby the electricity is conducted from the conductive element 62 to the tank body 311 through the tank shelf 32. Furthermore, the electrode shelf 33 is electrically connected to the electrode plate 312 of each electrolytic tank 31. The electrode shelf 33 has a second cylinder 332 to make the electrode shelf 33 electrically connect to another conductive element 61, whereby the electricity is conducted from the conductive element 61 to the electrode plate 312 through the electrode shelf 33. Therefore, the plurality of removable electrolytic tanks 31 are electrically connected in parallel.

In another one embodiment, when an electrolytic tank module 30 has four electrolytic tanks 31 connected to each other in parallel, the output voltage and current of the power source 60 are separately about 5 volt and 200 amp, namely the power of each electrolytic tank is 250 watt. Therefore, each electrolytic tank can electrolyze the liquid water to generate a hydrogen-oxygen gas. And through a way of connecting the electrolytic tank to the plurality of electrolytic tanks in parallel can make the total gas production increase.

Of course, in other embodiments, the operating voltage of each electrolytic tank can between 24 volt and 4 volt, for example 12 volt to 4 volt, and the operating current of each electrolytic tank can between 40 amps and 100 amps. The structure for connecting to electrolytic tanks in parallel is not limited to the tank shelf 32 and the electrode shelf 33, for example the conductive device 62 (also called as a second conductive element) and conductive device 61 (also called as a first conductive element) connected to the power source 60 are firstly connected to a control module, not shown in the figure, and then the plurality of electrolytic tanks are connected to the control module. In application, the control module can selectively control the entire or the part of electrolytic tanks 31 to electrolyze the water through the way of connecting to each other in parallel. And then the control module can further selectively control the gas production of the hydrogen-oxygen gas.

At least one gas outlet 3113 is configured in the upper or the top position of the electrolytic tank 31. The hydrogen-oxygen gas generated from the electrolytic tank 31 is outputted from each gas outlet 3113 to the inner tank 20 through a gas pipe 40. The inner tank 20 has a gas inlet 21. The gas inlet 21 can connect with the gas pipe 40 to input the hydrogen-oxygen gas to the inner tank 20. Of course, in another one embodiment, each electrolytic tank 31 can be firstly connected to a connected tank for gas transmission, not shown in the figure, and then the connected tank for gas transmission is connected to the gas inlet 21 of the inner tank 20 for making hydrogen-oxygen gas generated from each electrolytic tank 31 input to the inner tank 20. Namely, in this embodiment, the gas inlet of every inner tank 20 is not directly connected to the gas outlet 3113 of the electrolytic tank.

At the same time, the inner tank 20 stores the liquid water. In one aspect, the inner tank 20 storing the liquid water can supply the liquid water to the electrolytic tank 31. In another aspect, the inner tank 20 storing the liquid water can decrease the temperature of the hydrogen-oxygen gas generated from the electrolytic tank. When the hydrogen-oxygen gas is inputted to a second hollow portion S2 of the inner tank 20 through the gas pipe 40, the most hydrogen-oxygen gas will float out to the surface of the liquid water, namely the upper position of the inner tank 20. In the process of the hydrogen-oxygen gas floating out from the below of the liquid water to the surface of the liquid water, due to the liquid water in the inner tank 20 can absorb the heat and further decrease the temperature of the hydrogen-oxygen gas, and thus decreasing the probability for causing hydrogen explosion to increase the safety of the system. The hydrogen-oxygen gas after decreasing its temperature through the liquid water and filtering will be stored in the upper position of the inner tank 20 and be outputted from the gas outlet 23 of the upper position through the gas-out pipe 90 to provide the user for inhaling. At the same time, the flow rate of the hydrogen-oxygen gas may be between the 0.1 litters/min and 2 litters/min.

In another aspect, the liquid water in the electrolytic tank 31 is consumed by the electrolytic action, so the electrolytic tank 30 further comprise a water inlet 3112 to get and supply with the liquid water from the inner tank 20 through the transfusion pipe 50 and the connected tank 51. The position of the water inlet 3112, as shown in the figure, may be in the under or bottom portion of the electrolytic tank 30.

As shown in the FIG. 1, a water outlet 22 of the inner tank 20 is connected to the water inlet 3112 of each electrolytic tank 31 in the electrolytic tank module 30 through the transfusion pipe 50 and the connected tank 51. Therefore, the liquid water of the electrolytic tank 31 is supplied from the inner tank 20 through the transfusion pipe 50 and the connected tank 51 when the liquid water of the electrolytic tank 31 is consumed by the electrolytic action. Of course in another embodiment, each electrolytic tank 31 without connected tank can separately connect to the inner tank 20 through the independent transfusion pipe to supply the liquid water from the inner tank 20 to the electrolytic tank 31.

The better configuration of the inner tank 20 is higher than the electrolytic tank 31, as shown in the FIG. 1 the bottom portion of the inner tank 20 is higher than the top portion of the electrolytic tank 31, or the bottom portion of the inner tank 20 is higher than the bottom portion of the electrolytic tank 31. Now the inner tank 20 does not need other pressurized devices, the inner tank 20 can automatically supply water to the electrolytic tank 31. Furthermore, the hydrogen-oxygen gas inputted in the inner tank 20 will generate a pressure in the surface of the liquid water of inner tank 20. The pressure will promote the inner tank 20 to automatically supply water to the electrolytic tank 31.

Furthermore, in the inner tank 20 may be further configured a depressurizing device 24. When a pressure in the inner tank 20 stored the hydrogen-oxygen gas exceeds the preset pressure, the pressure can be depressurized through the depressurizing device 24 to prevent hydrogen explosion. For example, when the gas outlet 23 for discharging is abnormal, such as blockage and so on, the hydrogen-oxygen gas will be continuously generated from the electrolytic tank 31, and the gas production and pressure of the hydrogen-oxygen gas in the inner tank 20 will increase, and then the pressure will be depressurized through the depressurizing device 24. In one embodiment, the pressure will be depressurized when the preset pressure is at 1 atmosphere, and the depressurizing device 24 may be a solenoid valve.

Furthermore, the inner tank 20 may selectively comprise a water level monitor 25, shown in dotted lines. The water level monitor 25 is used for detecting the water level of the liquid water in the inner tank 20. The water level monitor 25 may be a simple control circuit or a computer system. When the water level of the liquid water in the inner tank 20 detected by the water level monitor 25 is smaller than a preset value, the water level monitor 25 may control a valve configured at a water inlet 29 of the top portion of the inner tank 20 to supply the liquid water, or using an alarming device informs the user to supply the liquid water through the water inlet 29. The alarming device may be any one of a whistle, an alarming bell, an alarming light, or an alarming message of the computer system. In addition to the low level of security, the water level monitor 25 may also be used for detecting the high level of security of the liquid water in the inner tank 20. When the water supplied by the user makes the water level be higher than a preset value of the high water level, the water level monitor 25 immediately illuminates the warning light for informing the user to stop supplying water.

Then, in order to easily clean and maintain, the inner tank 20 may be connected to a drain pipe 80. The drain pipe 80 is connected to the second hollow portion S2 of the inner tank 20 through the transfusion pipe 50 and the connected tank 51 for automatically discharging the liquid water out. The drain pipe 80 is further configured a valve 81, the valve may be a solenoid valve or a hand valve. The valve 81 may be controlled by the user to open or close the drain pipe 80. As an aside, the drain pipe 80 besides is connected to the inner tank 20, and the drain pipe 80 is also connected to the third hollow portion S3 of the electrolytic tank module 30 through the connected tank 51 for discharging the liquid water in each electrolytic tank 31.

In another aspect, a plurality of tongue portions 26 is configured in each side surface of the inner tank 20 of the present invention. In the present invention, the each tongue portions 26 is separately fixed on a supporting shelf 13 of the outer tank 10 through a plurality of screws. When the installation and assembly of the inner tank 20 and the electrolytic tank module 30, as shown in a first module 1 or a second module 2 in the FIG. 5, both of them have the inner tank 20 and the electrolytic tank 30, the supporting shelf 13 immersed in the outer tank 10 will be further cooled through the coolant in the outer tank 10. More particularly the at least part of the electrolytic tank module 30 in the first module 1 or second module 2 is immersed in the coolant of the outer tank 10 for cooling to reduce the possibility of the hydrogen explosion. In another embodiment, the entire electrolytic tank module 30 can be immersed in the coolant of the outer tank 10, or the at least part of inner tank 20 can be also immersed in the coolant of the outer tank 10.

Figure 6A:
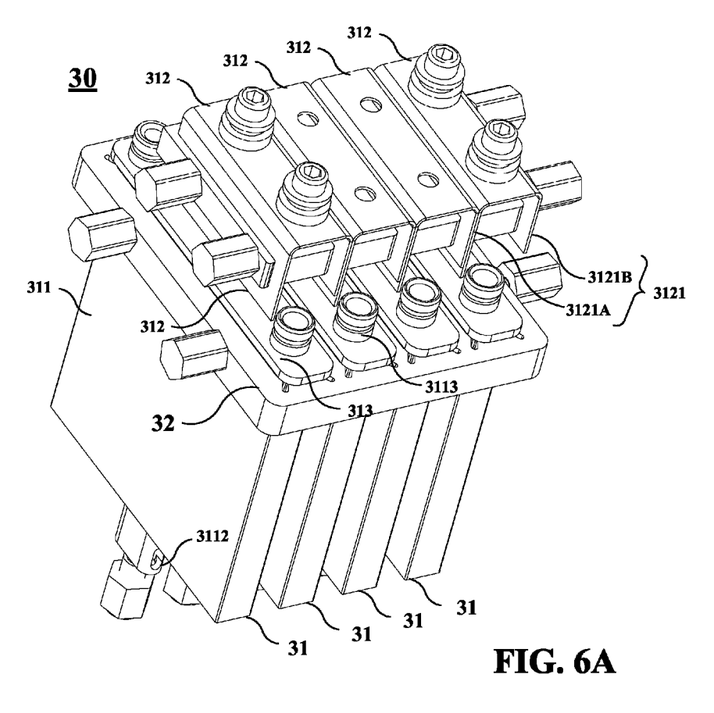
FIG. 6A is a stereoscopic schematic diagram illustrating the FIG. 3 according to a preferred embodiment only with electrolytic tank module.
Figure 6B:
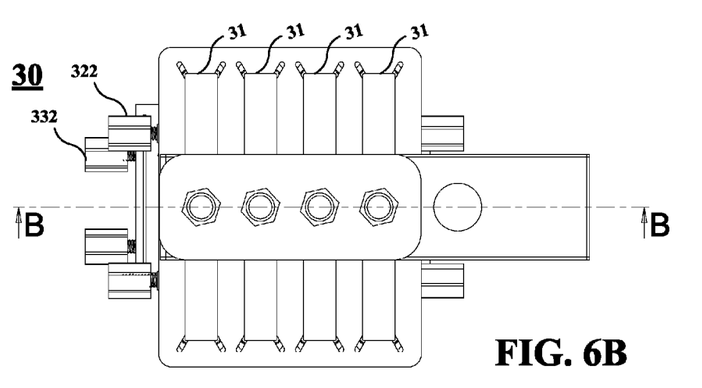
FIG. 6B is a bottom view illustrating the FIG. 3 according to a preferred embodiment only with electrolytic tank module.
Figure 6C:
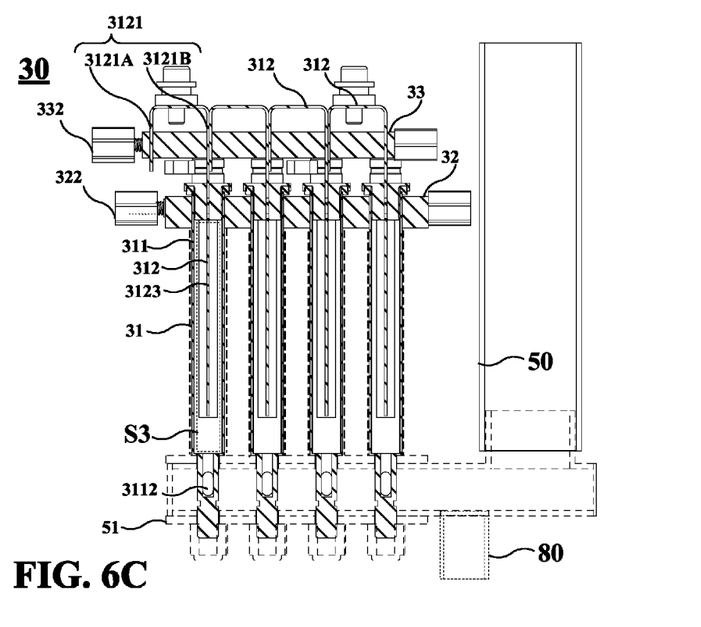
FIG. 6C is a sectional view, as observed in the plane of line B-B on FIG. 6B, illustrating the FIG. 3 according to a preferred embodiment only with electrolytic tank module.

As shown in the FIG. 6A, FIG. 6B, and FIG. 6C. The electrolytic tank module 30 comprises a plurality of electrolytic tanks 31, tank shelves 32, electrode shelf 33, and connected tanks 51. The connected tank 51 has a plurality of openings, and each opening is corresponded to the water inlet 3112 of the electrolytic tank 31. In the present embodiment, each electrolytic tank 31 is an electrolytic tank with the flat shape and is composed of a tank body 311, an electrode plate 312, and a cover body 313. The electrode plate has an upper portion 3121 and an under portion 3123. After the assembly of the electrolytic tank 31, the under portion 3123 of the electrode plate 312 is configured within the third hollow portion S3 of the electrolytic tank 31, and the upper portion 3121 of the electrode plate 312 is configured on the outer portion of the tank body 311.

The tank shelf 32 has a plurality of first longitudinal perforations 321 and laterally configured first cylinders 322. Each first longitudinal perforation 321 is provided for embedding the tank body 311 of each electrolytic tank 31 on the first longitudinal perforation 321 to maintain the relative position of each electrolytic tank 31. The tank body 311 is laterally penetrated through and coupled to the first cylinders 322 of the tank shelf 32. And in the present embodiment, the first cylinders 322 of the tank shelf 32 can be connected to the conductive element 62, whereby the electricity is conducted from the conductive element 62 to the tank body 311 through the tank shelf 32. Of course in another embodiment, the conductive element 62 may also be directly electrically connected through the first cylinders 322 and tank body 311 for electrically conducting. It can be seen that the plurality of tank bodies 311 are electrically connected to the conductive element 62.

In another aspect, the under portion 3123 of the electrode plate 312 is configured in the electrode shelf 33. The electrode shelf 33 has a plurality of second longitudinal perforations 331 and laterally configured second cylinder 332. Each second longitudinal perforation 331 is provided for embedding the upper portion 3121 of each electrode plate 312 on the second longitudinal perforation 321 to maintain the relative position of each electrode plate 312. In a finishing assembly condition, the electrode plate 312 is laterally penetrated through and coupled to the second cylinder 332 of the electrode shelf 33. And in the present embodiment, the second cylinder 332 of the electrode shelf 33 can be connected to the conductive element 61, whereby the electricity is conducted from the conductive element 61 to the electrode plate 312 through the electrode shelf 33. Of course in another embodiment, the conductive element 61 may also be directly electrically connected through the second cylinder 332 and electrode plate 312 for electrically conducting. It can be seen that the plurality of electrode plates 312 are electrically connected to the conductive element 61. As an aside, the first cylinders 322 and the second cylinder 332 may be a copper rod or other high-conductivity materials.

At the same time, in the present embodiment, the upper portion 3121 of the electrode plate 312 may be divided into a head portion 3121A and a neck portion 3121B. Furthermore, the upper portion 3121 of the electrode plate 312 is approximately an inverted U-shape. And the head portion 3121A of the electrode plate 312 may be connected to the neck portion 3121B of the neighboring electrode plate to be configured in the second longitudinal perforation 331 of the same electrode shelf 33. And thus each electrode plate 312 may be closely configured to each other for getting the better conducting performance.

Figure 7A:
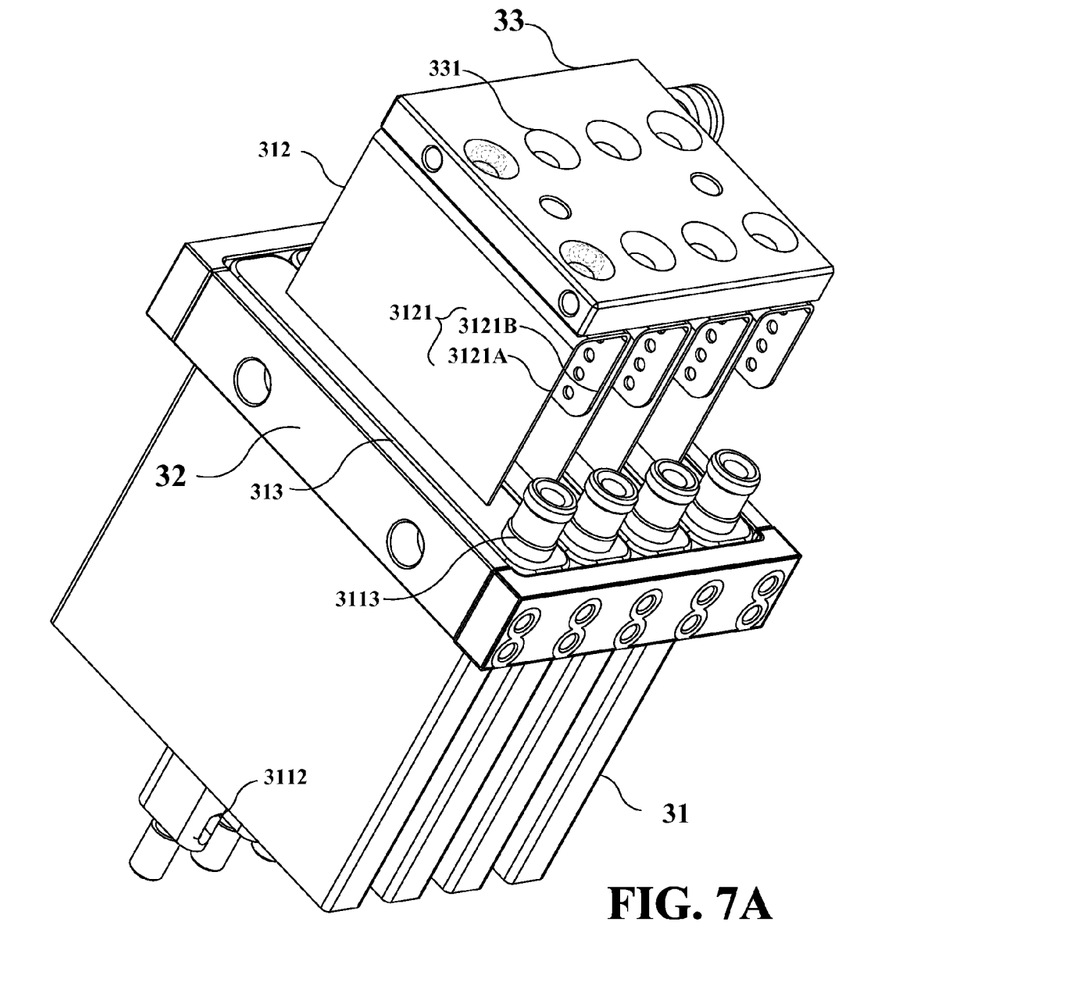
FIG. 7A is a stereoscopic schematic diagram illustrating another preferred embodiment with electrolytic tank module.
Figure 7B:
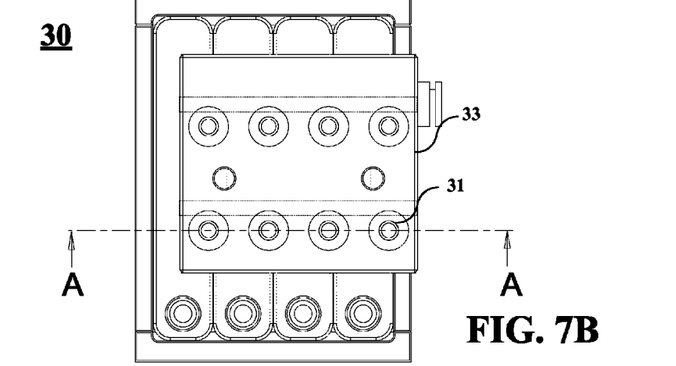
FIG. 7B is a bottom view illustrating another preferred embodiment with electrolytic tank module.
Figure 7C:
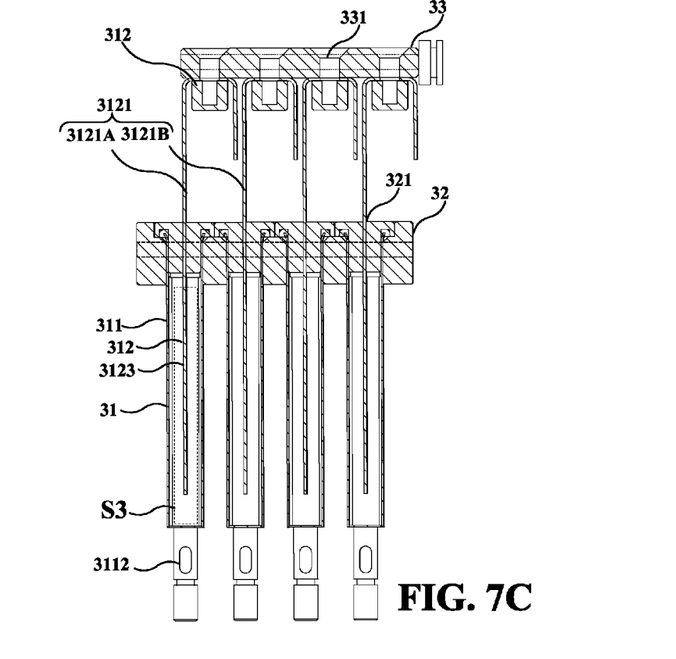
FIG. 7C is a sectional view, as observed in the plane of line A-A on FIG. 7B, illustrating another preferred embodiment with electrolytic tank module.

Furthermore, the design of the electrode shelf 33 of the invention is not limited thereto. The above example is that the electrode shelf 33 is penetrated through the upper portion 3121 of the electrode plate 312, and the head portion 3121A and the neck portion 3121B are configured in the different longitudinal perforations. Compare to the above example, as shown in the designs illustrated in the FIG. 7A, FIG. 7B, and FIG. 7C, the upper portion 3121 of the electrode plate 312 may not penetrate to the electrode shelf 33 to make the entire electrode plate 312 be maintained at the same end of the electrode shelf 33. The relative position of the electrode shelf 33 and electrode plate 312 is fixed through using a second longitudinal perforation 331 penetrated through the electrode shelf 33 and a connecting piece, such as screw, not shown in the figure. Then, the electrode shelf 33 has the second cylinder 332. The electrode shelf 33 is laterally penetrated through and coupled to the second cylinder 332. The second cylinder of the electrode shelf 33 can be electrically connected to the conductive element 61, whereby the electrical power can be supplied from the second cylinder 332 to the electrode plate 312 through the electrode shelf 33, as shown in the FIG. 7A to FIG. 7C.

As mentioned above, in order to supply the electrical power to the electrolytic tank 31, the tank shelf 32 or the first cylinder 322 of the tank shelf 32 can be electrically connect to the tank body 311 of the electrolytic tank 31, and the electrode shelf 33 or the second cylinder 332 of the electrode shelf 33 can be electrically connect to the electrode plate 312 of the electrolytic tank 31. Furthermore, the first cylinder 322 of the tank shelf 32 and the second cylinder 332 of the electrode shelf 33 are separately electrically connected to the conductive elements 61, 62. The electrical power needed for electrolyzing water by the electrolytic tank 31 is supplied through the power source 60 connected to the conductive elements 61, 62. In the present embodiment, the tank body 311 of the electrolytic tank 31 can be a cathode, and the electrode plate 312 of the electrolytic tank 31 can be an anode, but not limited thereto. In practical application, the electric properties of the tank body 311 and electrode plate 312 may also be separately adjusted by the user according to their need. Therefore, in the present embodiment, the electrical connection way of the plurality of electrolytic tank 31 forms parallel connection. Namely the tank body 311 of all of the electrolytic tank 31, the cathode, is electrically connected to conductive element 62, and the electrode plate 312 of all of the electrolytic tank 31, the anode, is electrically connected to the conductive device 61.

In another embodiment, the fixed way of the tank body 311 or electrode plate 312 cannot need the first cylinder 322 or the second cylinder 332 and only need the tank shelf 32 or electrode shelf 33 for fixing and electrically connected the tank shelf 32 or electrode shelf 33 to the conductive elements 61, 62. Furthermore, the structure and the shape of the tank shelf 32 or electrode shelf 33 are not limited to the above structure, as long as the tank body 311 or the electrode can be fixedness.

In another embodiment, the tank body 311 of the electrolytic tank 31 is not deemed as the electrode. And in each electrolytic tank can comprise two plates of electrode plate penetrated to the above cover body 313, one plate is deemed as the anode, and the other plate is deemed as the cathode. In order to make two electrode plates are insulated to each other, the cover body 313 may be made by insulation materials. When the plurality of electrolytic tanks are electrically connected in parallel, all of the anode electrode plates in electrolytic tank are electrically connected to each other, and all of the cathode electrode plates are electrically connected to each other. The above electrical connection can be achieved through the electrode shelf or tank body, and only note that the anode and the cathode are isolated to each other.

In order to easily clean and maintain, the bottom portion of the outer tank 10 may has a drain pipe 70 with a valve 71. The drain pipe 70 is configured on the outer side surface of the bottom portion of the outer tank 10. The drain pipe 70 is connected to the first hollow portion Si of the outer tank 10 for discharging the coolant from the first hollow portion Si to the outside of the outer tank 10. Correspondingly, in order to supply the coolant, the top portion of the outer tank 10 is configured with a water inlet 12 for inputting the coolant. The coolant may be water or other liquids with cooling effect.

In conclusion, the temperature of hydrogen-oxygen gas generated by the electrolytic tank 31 can be decreased through the liquid water of the inner tank 20 to prevent hydrogen explosion. Furthermore, the water level of the inner tank 20 is detected through the water level monitor in the inner tank 20, and the amount of hydrogen-oxygen gas in the inner tank 20 can be maintained by the depressurization of a relief valve, to prevent hydrogen explosion. The storage capacity of hydrogen-oxygen gas stored in the upper portion of the inner tank 20 can be adjusted through the relief valve to automatically depressurize for achieving the effect of preventing hydrogen explosion. Then, in the present invention, the design of the gas outlet and the water inlet of the electrolytic tank 31 and the design of the gas outlet and the water inlet of the inner tank 20 make the pure water in the inner tank 20 be automatically supplied to the electrolytic tank 31, and the hydrogen-oxygen gas generated by the electrolytic tank 31 can be automatically discharged to the inner tank, and then to achieve the gas-water circulation. Furthermore, the temperature of the hydrogen-oxygen gas generated by the electrolytic tank module 30 will be further cooled through immersing the electrolytic tank module 30 in the coolant of the outer tank 10 to increase the safety of the present invention.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the meets and bounds of the appended claims.

The invention claimed is:

1. A gas generator, comprising:
   an outer tank, having a first hollow portion for accommodating a coolant;
   an inner tank, configured within the first hollow portion of the outer tank, the inner tank having a second hollow portion for accommodating a liquid water, the inner tank connected to a gas-out pipe; and
   an electrolytic tank module, configured in the first hollow portion of the outer tank, for electrolyzing the liquid water;
   wherein part of or the entire electrolytic tank module is immersed in the coolant, the electrolytic tank module is supplied with the liquid water through the inner tank, the electrolytic tank module electrolyzes the liquid water to generate a hydrogen-oxygen gas, the hydrogen-oxygen gas is outputted to the inner tank, and then the hydrogen-oxygen gas is outputted through the gas-out pipe of the inner tank.

2. The gas generator of claim 1, wherein the electrolytic tank module comprises at least one electrolytic tank, the electrolytic tank has a third hollow portion, a water inlet, and a gas outlet, the third hollow portion is used for accommodating the liquid water, the gas outlet of the electrolytic tank outputs the hydrogen-oxygen gas to the inner tank, the electrolytic tank is removably configured in the electrolytic tank module, and the electrolytic tank is supplied with the liquid water from the water inlet of the electrolytic tank through the inner tank.

3. The gas generator of claim 2, wherein the electrolytic tank module further comprises a tank shelf, the tank shelf comprises a plurality of first longitudinal perforations, the electrolytic tank comprises a tank body, and the tank body is correspondingly configured within one of the first longitudinal perforations of the tank shelf.

4. The gas generator of claim 3, wherein the electrolytic tank module further comprises an electrode shelf, the electrode shelf comprises a plurality of second longitudinal perforations, the electrolytic tank comprises an electrode plate, the electrode plate is correspondingly configured within one of the second longitudinal perforations, and the under portion of the electrode plate is configured within the third hollow portion of the electrolytic tank.

5. The gas generator of claim 4, wherein the tank shelf comprises a first cylinder, the tank body of the electrolytic tank is penetrated through the first cylinder; and the electrode shelf comprises a second cylinder, the electrode plate of the electrolytic tank is penetrated through the second cylinder.

6. The gas generator of claim 5, wherein the entire tank body of the electrolytic tank is immersed in the coolant.

7. The gas generator of claim 6, wherein an outer surface of the tank body of the electrolytic tank is coated with an insulating material.

8. The gas generator of claim 5, wherein the part of the inner tank is immersed in the coolant.

9. The gas generator of claim 5, wherein the electrolytic tank further comprises a cover body, the cover body is used for isolating between the electrode plate and the tank body, the first cylinder of the tank shelf is connected to a conductive element, and the second cylinder of the electrode shelf is connected to another conductive element so as to make the electrode plate of the electrolytic tank be an anode and the tank body of the electrolytic tank be a cathode.

10. The gas generator of claim 1, wherein the outer tank is configured a drain pipe and a valve cooperating with the drain pipe for discharging the coolant from the outer tank.

11. The gas generator of claim 10, wherein the electrolytic tank module further comprises a connected tank, a transfusion pipe, and a drain pipe, the connected tank comprises a plurality of openings, the water inlet of the electrolytic tank is corresponded to one of the openings of the connected tank, the transfusion pipe is connected to the inner tank, and the drain pipe is connected to the connected tank for connecting the drain pipe and transfusion pipe to discharge the liquid water from the inner tank and the electrolytic tank.

12. The gas generator of claim 1, wherein the outer tank comprises a supporting shelf, a plurality of tongue portions are configured in the inner tank for fixing the inner tank on the supporting shelf of the outer tank.

13. A gas generator, comprising:
an outer tank, having a first hollow portion for accommodating a coolant;
an inner tank, having a second hollow portion for accommodating a liquid water; and
an electrolytic tank module, comprising a plurality of removable electrolytic tanks, each electrolytic tank having an anode and a cathode, the electrolytic tank module supplied with the liquid water through the inner tank, the electrolytic tank module for electrolyzing the liquid water to generate a hydrogen-oxygen gas;
wherein the anode of each electrolytic tank is electrically connected to each other, the cathode of each electrolytic tank is electrically connected to each other, whereby the plurality of electrolytic tanks of the electrolytic tank module are electrically connected in parallel, and a part of or the entire electrolytic tank module is immersed in the coolant.

14. The gas generator of claim 13, wherein the electrolytic tank module comprises a tank shelf and an electrode shelf, each electrolytic tank comprises a tank body and an electrode plate, the tank shelf is electrically connected to the tank body of each electrolytic tank, and the electrode shelf is electrically connected to electrode plate of each electrolytic tank, the electrode shelf is electrically connected to a first conductive element, and the tank shelf is electrically connected to a second conductive element, whereby the electrode plate of each electrolytic tank is an anode, and the tank body of each electrolytic tank is a cathode.

15. The gas generator of claim 14, wherein the part of or the entire inner tank is immersed in the coolant.

16. The gas generator of claim 15, wherein the electrolytic tank further comprises a cover body, the cover body is used for isolating between the electrode plate and the tank body, an outer surface of the tank body of the electrolytic tank is coated with an insulating material.

17. A gas generator, comprising:
a power source, comprising a first conductive element and a second conductive element;
an electrolytic tank module, for electrolyzing a liquid water to generate a hydrogen-oxygen gas, the electrolytic tank module comprising a plurality of removable electrolytic tanks, each electrolytic tank comprising an anode and a cathode; and
an outer tank, having a first hollow portion for accommodating a coolant, a part of or the entire electrolytic tank module immersed in the coolant;
wherein, the anode of each electrolytic tank is electrically connected to the first conductive element, and the cathode of each electrolytic tank is electrically connected to the second conductive element.

18. The gas generator of claim 17, wherein each electrolytic tank comprises a tank body and an electrode plate, the electrode plate of each electrolytic tank is an anode, and the tank body of each electrolytic tank is a cathode.

\* \* \* \* \*